Jan. 25, 1938.  W. A. MOORHEAD  2,106,645
FERTILIZER DISTRIBUTOR
Filed June 12, 1937   2 Sheets-Sheet 1
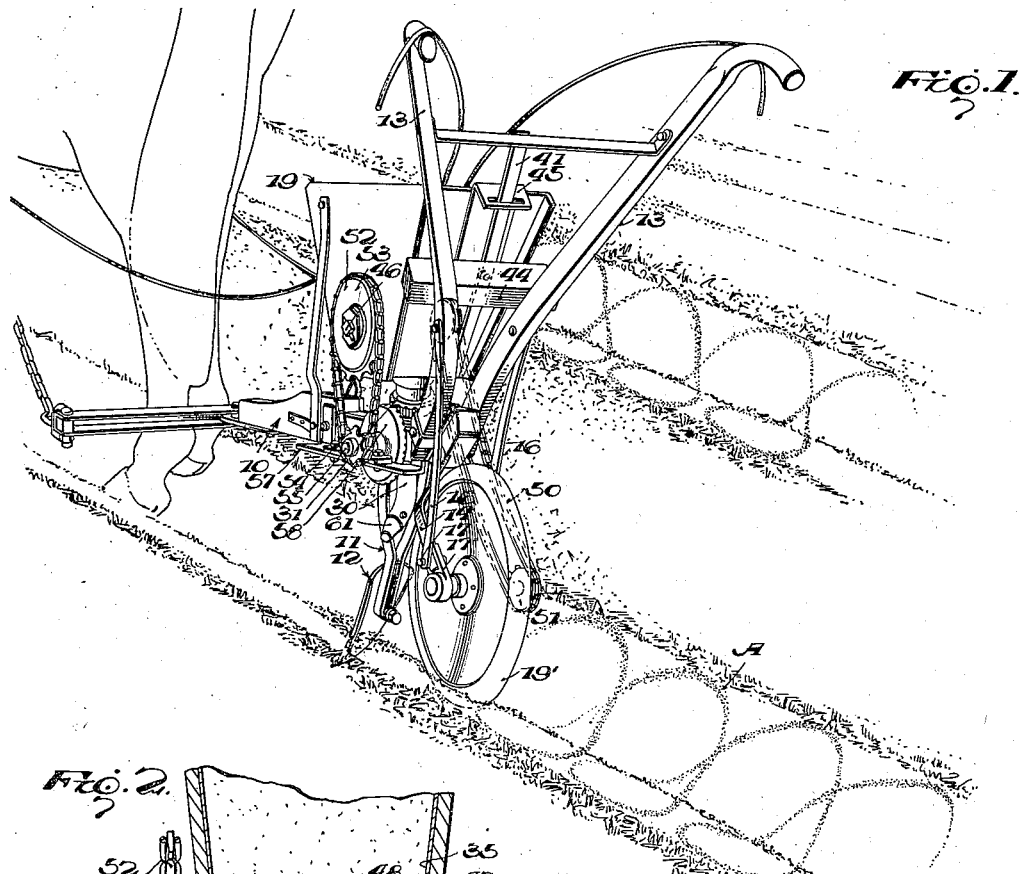
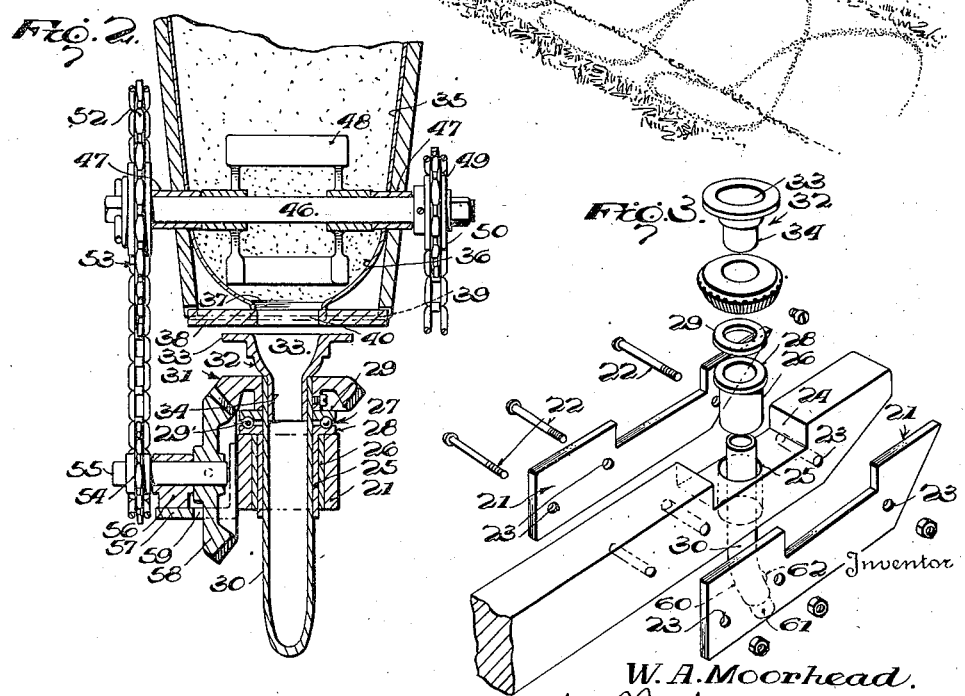

Jan. 25, 1938.  W. A. MOORHEAD  2,106,645
FERTILIZER DISTRIBUTOR
Filed June 12, 1937  2 Sheets-Sheet 2
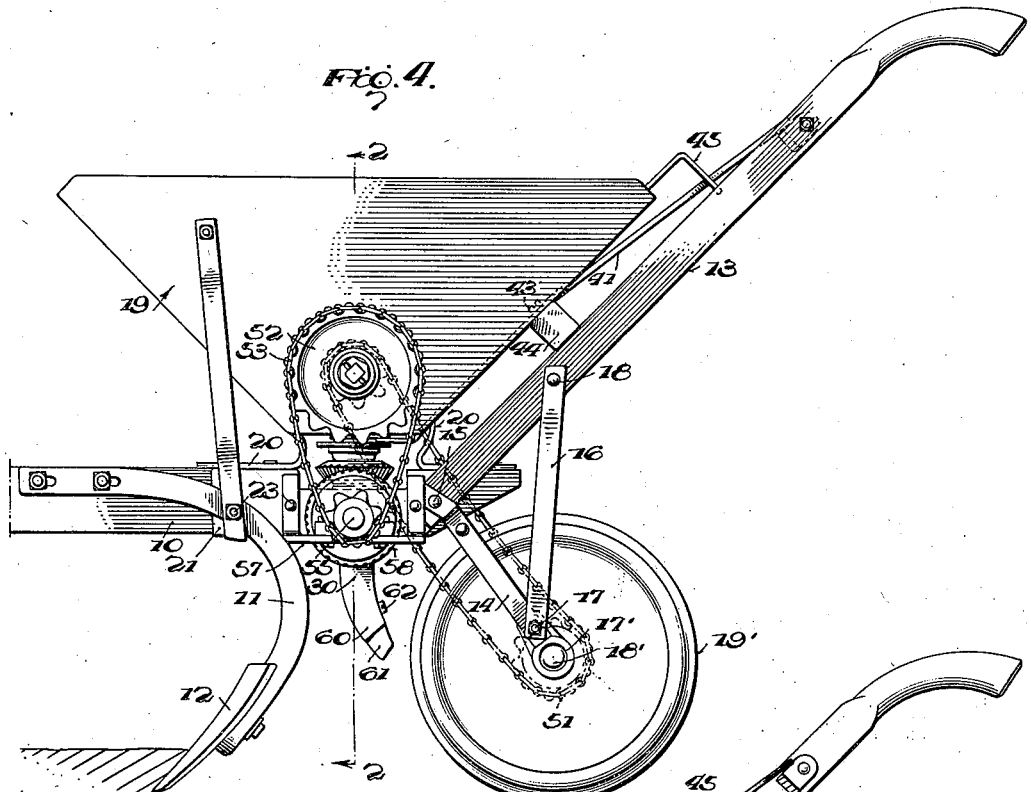
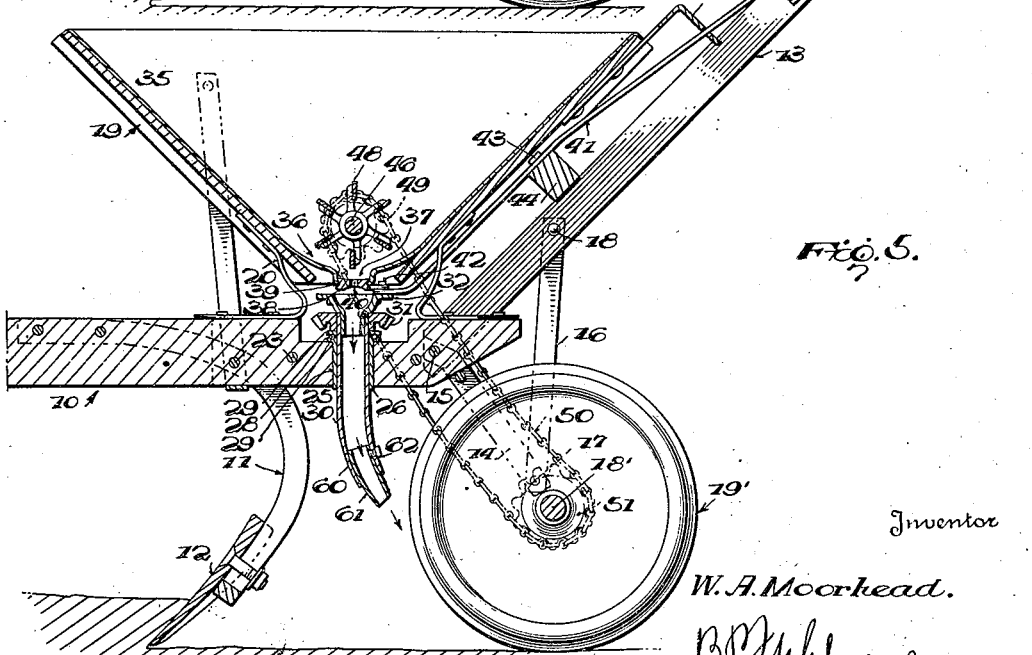
Inventor
W. A. Moorhead.
By
Attorney Patented Jan. 25, 1938

2,106,645

UNITED STATES PATENT OFFICE 2,106,645

FERTILIZER DISTRIBUTOR

Walter A. Moorhead, Sandy Springs, S. C.

Application June 12, 1937, Serial No. 147,956

4 Claims. (Cl. 275—8)

My invention relates to fertilizer distributors.

An important object of the invention is to provide apparatus of the above mentioned character for evenly distributing fertilizer to prevent damage either to seed or young tender plant roots and to increase the yield of the crop by making the fertilizer more available.

A further object of the invention is to provide apparatus of the above mentioned character, which will distribute the fertilizer in a furrow in generally circularly curved paths, upon opposite sides of the furrow, so that the fertilizer may be readily mixed with the soil in hilling or covering the seed.

A further object of the invention is to provide apparatus of the above mentioned character, which will meet the requirements upon a cotton farm or other row crop farm, both as a fertilizer distributor, and as a seed sowing apparatus.

A further object of the invention is to provide apparatus of the above mentioned character, which is light, wholly practical for use where the rows are short or crooked, and may be used equally well on a level ground or a hillside.

Other objects and advantages of the invention will be apparent during the course of the following description.

In the accompanying drawings forming a part of this application and in which like numerals are employed to designate like parts throughout same, Figure 1 is a perspective view of a fertilizer distributor embodying my invention, Figure 2 is a transverse section taken on line 2—2 of Figure 4, parts omitted, Figure 3 is an exploded perspective view of the rotary spout and associated elements.

Figure 4 is a side elevation of the machine, parts broken away, and,

Figure 5 is a central vertical longitudinal section through the machine, parts broken away.

In the drawings, wherein for the purpose of illustration is shown a preferred embodiment of my invention, the numeral 10 designates a beam, having a stock 11 rigidly secured thereto, carrying a plow share 12. Rigidly attached to the rear end of the beam 10 are handles 13. The numeral 14 designates a pair of spaced arms, which are rigidly attached at 15 with the beam 10 and handles 13. These arms are also connected with diagonal braces 16, as shown at 17, and these braces are attached to the handles 13, as shown at 18. Bearings 17' are secured to the arms 14, and these bearings receive a shaft 18', having a traction wheel 19' rigidly mounted thereon. The numeral 19 designates a hopper, tapering downwardly, and attached to strap-irons 20, in turn rigidly attached to the rear end of the beam 10.

Since the rear end of the beam 10 is cut away, to a considerable extent, Figure 3, I provide a pair of reinforcing metal plates 21, applied to the opposite sides of the beam, at its rear end, and rigidly attached thereto by bolts 22, passing through openings 23, as shown. The beam 10 is provided near its rear end with a top recess 24 and a vertical opening 25, receiving a sleeve 26 preferably having a snug fit thereon, to be held against turning movement. This sleeve is therefore fixedly secured to the beam 10 and is provided at its top with an end thrust bearing 27. This end thrust bearing comprises a ring or flange 28, carried by the sleeve 26 and an upper ring 29, with bearing balls 27 arranged between the same, as shown. Rotatable within the sleeve 26 is a depending vertical outlet or distributing tube 30, to the upper end of which is rigidly attached a horizontal bevel-gear 31. The hub of this bevel-gear rests upon the ring 29 of the end thrust bearing. Arranged above the tube 30 is a tubular coupling element 32, including an upper bowl 33, and a lower reduced extension 34, projecting into the upper end of the tube 30, as shown. The tubular coupling 32 preferably rotates with the tube 30.

The hopper 19 has a liner 35, preferably formed of metal, which tapers downwardly to produce a reduced bottom 36, having an outlet opening 37. This outlet opening is directly over the tubular coupling 32 and in alignment therewith, to discharge fertilizer, seed or the like into the tubular coupling. The discharge of material through the opening 37 is regulated by a sliding gate or valve 38, operating within guide grooves 39, and having a discharge opening 40, for movement into and out of registration with the opening 37. The gate 38 is moved by a lever 41, pivotally connected with the gate 38 at 42, and this lever is pivotally mounted at 43, upon a transverse bar 44, attached to the handles 13. Lever 41 also operates within a guide 45, as shown. Mounted within the hopper 19 is a transverse shaft 46, journaled in bearings 47, and carrying a rotary agitator 48. Rigidly attached to one end of the shaft 46 is a sprocket wheel 49, engaged by a sprocket chain 50, extending downwardly to engage a sprocket wheel 51, rigidly mounted upon the shaft 18'. Rigidly secured to the opposite end of the shaft 46 is a sprocket wheel 52, engaging a sprocket chain 53, extending downwardly to engage a sprocket wheel 54. The sprocket chain 53 preferably has its ends detachably connected, so that it may be readily removed from the sprocket wheels 52 and 54 when desired. The sprocket wheel 54 is rigidly mounted upon a stub-shaft 55, journaled in a bearing 56, rigidly attached to a bracket 57, in turn rigidly attached to the adjacent plate 21. At its inner end, the stub shaft 55 has a vertical bevel-gear 58, rigidly attached thereto, and this bevel-gear operates within the opening 59 of the bracket 57 and permanently engages the horizontal bevel-gear 31.

The spout 30 has its lower discharge portion 60 laterally or radially offset or bent, so that it will discharge the material in a circular path, due to the rotation of the tube 30. It is preferred that the portion 30 be adjustable to vary its sweep, and to accomplish this the portion 60 has a tubular part or nozzle 61, longitudinally adjustable therein, and adapted to be clamped in position by a bolt 62 or the like.

The operation of the machine is as follows:

The machine is drawn forwardly down the furrow and the wheel 19' travels within the furrow, and the plow share 12 operates within the furrow. The rotation of the wheel 19' is transmitted to the shaft 46, which drives the agitator 48, and the rotatable tube 30, through the medium of the gearing. The gate 38 being suitably adjusted, the fertilizer passes into the tube 30 and is discharged upon the sides of the furrow in generally circular paths A, Figure 1. It is thus seen that the fertilizer will not be deposited next to or in contact with the seed or young plant, but at proximity thereto and suitably spaced therefrom. This enables the fertilizer to become properly mixed with the soil, when the row is hilled, or during cultivation.

The machine may be readily converted into a seeder for planting small seed, such as oats, wheat, barley, rye, or any of the smaller seeds. To accomplish this, the chain 53 is removed and the spout 30 adjusted so that its radial extension 60 will be in alignment with the longitudinal axis of the furrow or row. Before the chain is removed the machine may be used to sow winter peas or the like broadcast, by the revolving spout.

An important feature of the invention, as a fertilizer distributor, is the lightness and ease of operation of the machine. The end thrust bearing 27 permits of the rotation of the tube 30 with a minimum friction. The drive for the several elements is also simple and strong.

It is to be understood that the form of my invention herein shown and described is to be taken as a preferred example of the same and the various changes in the shape, size, and arrangement of parts, may be resorted to, without departing from the spirit of my invention or the scope of the subjoined claims.

Having thus described my invention, what I claim is:

1. A fertilizer distributor comprising a beam, a hopper mounted upon the beam and having an outlet opening in its bottom, an end thrust bearing mounted upon the beam, a spout passing through the end thrust bearing and arranged beneath the hopper and having its upper end receiving the fertilizer from the hopper, a horizontal bevel-gear mounted upon the spout above the end thrust bearing, a vertical bevel-gear mounted upon the beam and engaging the horizontal bevel-gear, a wheel for supporting the beam, a horizontal shaft extending through the hopper, an agitator mounted upon the shaft, gearing connecting the horizontal shaft and wheel, and gearing connecting the horizontal shaft and vertical bevel-gear.

2. A fertilizer distributor comprising a beam provided with a recess and a vertical opening leading into the recess, a sleeve held within the vertical opening, an end thrust bearing carried by the upper end of the sleeve and arranged within the recess, a spout rotatable within the sleeve and having a radial extension, a horizontal bevel-gear fixed to the upper end of the spout and arranged above the end thrust bearing, reinforcing plates secured to the opposite sides of the beam adjacent to the recess and opening, a bracket secured to one plate, a bearing secured to the bracket, a horizontal stub-shaft within the bearing, a vertical bevel-gear carried by the stub-shaft and engaging the horizontal bevel-gear, a sprocket wheel carried by the stub-shaft, a hopper mounted upon the beam above the spout, a horizontal shaft extending through the hopper, an agitator on the horizontal shaft, a sprocket wheel carried by the horizontal shaft, a removable sprocket chain connecting the first and second named sprocket wheels, a wheel for supporting the beam, and gearing connecting the last named wheel and said horizontal shaft.

3. A fertilizer distributor comprising a beam, a single wheel connected with the beam to support it, handles connected with the rear end of the beam, a hopper mounted upon the beam, a rotatable spout having a lateral projection mounted upon the beam beneath the hopper to receive material from the hopper and arranged in advance of the single wheel, an agitator arranged within the hopper, driving means arranged upon one side of the beam and connecting the wheel and the agitator, and driving means arranged upon the opposite side of the beam and connecting the agitator and rotatable spout.

4. A fertilizer distributor comprising a support, a hopper mounted upon the support and having an outlet opening near its bottom, a rotatable spout carried by the support and arranged beneath the hopper and having its upper end receiving material from the hopper, the spout having a lateral extension, a horizontal bevel gear mounted upon the spout, a wheel for supporting the support, a horizontal shaft extending through the hopper, an agitator mounted upon the shaft, gearing connecting one end of the horizontal shaft and wheel, and gearing connecting the opposite end of the horizontal shaft and the horizontal gear.

WALTER A. MOORHEAD.